Sept. 17, 1940.   W. BOE ET AL   2,214,827
HACK SAW BLADE
Filed May 24, 1939
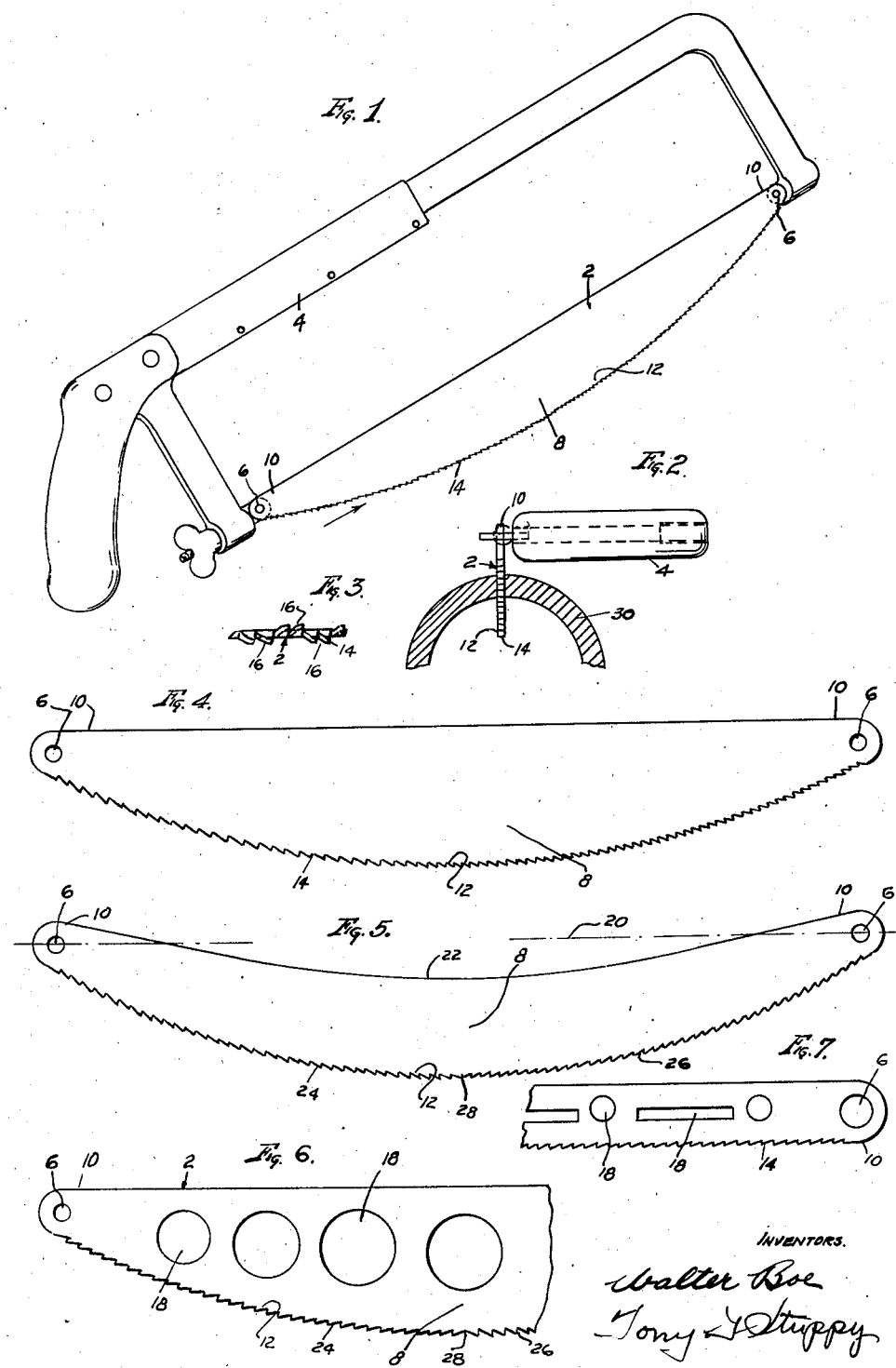

Patented Sept. 17, 1940

2,214,827

UNITED STATES PATENT OFFICE 2,214,827

HACK SAW BLADE

Walter Boe and Tony G. Stuppy, San Gabriel, Calif.

Application May 24, 1939, Serial No. 275,461

3 Claims. (Cl. 29—95)

Our invention relates to the hack saw blades and more particularly to the special shape of the blade and the position of the cutting edge, which provides a greater number of teeth per inch in the blade length, having in addition thereto a plurality of cooling and lubricating means positioned therein adapted for cooling said saw blade when in use.

In the general practice the hack saw blade, when in use, can only be employed for cross cutting of the objects and substances such as metals and the like, and, when cutting heavy metal having considerable thickness, it is found very difficult for the saw teeth to clear its shavings which when coagulated therein it contributes greatly to the dulling and to breaking of the teeth edges, further, in the following teeth on the straight line, the foremost teeth undertake the burden of cutting, so that in a short time the most exposed teeth edges are practically dull and then they become worn off very easily and readily, also, in practice, said saw teeth and the blade presents a very difficult problem for lubrication, which when overheated said saw teeth become easily crystallized, causing them to break off and therefore rendering said saw blade entirely useless.

Accordingly, an object of our invention is to provide said saw blade with a suitable curved cutting edge which is provided with the required cutting teeth, also having each individual saw tooth exposed over the other in their respective positions, so that when at a tangent with the material required to be cut it provides a circular clearance and thereby increasing the cutting efficiency of the said hack saw blade.

Another object of our invention is to provide said saw blade at its surface with a plurality of apertures, holes or perforations which may be in any form or configuration most adaptable in practice, so that the lubrication fluid or medium may accumulate therein and permit a continuous lubrication of said blade, thereby preventing the heat concentration and consequently preventing the crystallizing action of the saw teeth when overheated.

Further object of our invention is to provide said saw blade with a curved saw teeth edge which has its peripheral teeth line below the line of anchorage and having the teeth so exposed, whereby a portion cut within a plane, or, a longitudinal cut or slot within a pipe may be cut, without the use of drills and chisels.

Another object of our invention is to provide said saw blade with a suitable circular edge whereupon the saw teeth are cut, having said teeth cut thereon oppositely in the cutting and the teeth pitch angular position and terminating at its center, so that when said saw blade is in use, the usual rocking motion of the blade will provide the cutting edge for the forward and backward stroke.

Further objects and advantages of our invention as will hereinafter more fully appear, we attain by the construction herein shown on the drawing and described in the specification forming a part of our application.

Reference is had to the accompanying drawing, in which the similar reference characters denote the similar parts.

In the drawing:

Fig. 1 is the perspective view of the saw blade showing our preferred construction, which is shown attached to the conventional frame.

Fig. 2 shows the blade attached to the frame and held in place at right angle thereto, and in this position being adapted for cutting a slot in the pipe section.

Fig. 3 is the fragmentary view of the edge, showing the saw teeth in staggered position, taken in the direction of the arrow 3 of the Fig. 1.

Fig. 4 shows the side elevational view of the saw blade showing the cutting teeth positioned upon the circular edge thereof.

Fig. 5 shows the side elevational view of the saw blade showing the cutting teeth from the center leading outwardly and reversely in their angular positions, shown in modified form.

Fig. 6 shows the fragmentary side elevational view of the saw blade showing the lubricating and cooling means in place.

Fig. 7 shows the fragmentary side elevational view of the straight type saw blade, showing the lubricating and cooling means in position, in modified form.

Describing our invention more in detail, in its broader aspect, said invention comprises a saw blade generally designated by numeral 2 which may be of any desired length and adapted to be attached to the conventional hack saw blade frame 4 and be held attached thereto by means of the anchorage holes 6, as shown.

The center section of the said blade 2 is wider as at 8 as compared with the blade ends 10, thus forming the circular edge 12 upon which the saw teeth 14 are cut, see Fig. 4, which are staggered as at 16, see Fig. 3, so that the said teeth 14 may at all times be exposed sidewardly and circularly to the substance or material subjected to cutting.

The said circular edge 12 in linear dimension, is longer than the equivalent distance between the anchorage holes 6, which permits a greater amount of teeth per inch length to be cut thereon, and because of their relatively circular positions, each individual saw tooth 14 is circularly exposed over the other, thus presenting an outstanding cutting point or tooth edge when employed in cutting metals or the like, and also preventing the coagulation of the chips and shavings there between.

For the purpose to prevent the over heating of the saw blade and for preventing the crystallization of the teeth 14, said blade section 8 is provided with a plurality of apertures or holes 18, which, because of their respective positions the radiation of the heat from said blade 2 is greatly facilitated and at the same time providing means for lubricating same at the teeth section 14 and the blade surface 8, which prevents the blade or the teeth breaking off when in use, see Figs. 6 and 7.

In the Fig. 5, we have shown a saw blade 2 in modified form, having its center section 8 partially below the line of anchorage 20 which coincides with the anchorage holes 6 and thus forming a blade dwell 22 for allowing a greater stability for the blade when a pressure is applied thereto, further, the blade edge 12 is provided with a set of saw teeth 24 and 26 beginning at the center line 28 and having their tooth pitch angle oppositely positioned, so that during the usual rocking motion of the blade frame 4, when in use, and particularly when cutting a slot in or upon a flat plate, or when cutting a longitudinal slot within a pipe 30, see Fig. 2, a useful pressure may be imposed upon said saw blade 2 at and during the forward and backward stroke, and therefore increasing the efficiency and the speed of cutting operation.

In operation, the saw blade 2 herein shown and described and when used in said frame 4 or any other frame most adaptable in practice, may be employed for cutting longitudinal slots and cuts in pipes, or, it may be used for cutting portions out of the flat stock or sheets without the use of hole drilling or the use of some other tools, such as chisels, which will distort the edges requiring finishing, so that by the use of the saw blade herein shown much finer workmanship may be had including the time saving in doing the work.

Also it may be noted, that said blade 2 particularly as shown in Fig. 5, may be used for circular cutting when placed and held in suitable frame (not shown), and which because of its construction it adapts itself for bending to form a required arc, whereupon it may be used for cutting circles, circular discs or any other circular configurations out of and upon the sheet metal stock and for whatever purpose it may be required, also that it may be used in cutting when employing a forward and backward motion.

While we have thus described our invention with great particularity, it will be clear that the same may be modified throughout a wide range.

We accordingly do not propose to be limited to the exact details of construction herein shown on the drawing and described in the specification, but reserve the rights in practice to make the necessary changes and modifications therein which may come within the scope of the appended claims.

We claim as our invention:

1. In the hack saw blade of the class described comprising a longitudinal saw blade having a comparatively wide center section and gradually diminishing in its width toward the ends thereof, a convex saw tooth edge positioned at one side edge of said longitudinal blade, two sets of saw teeth positioned at said convex edge of said blade, each set extending outwardly from the center section of said blade having their teeth and in pairs staggered sidewardly and alternately, so that the saw tooth edges may be exposed sidewardly and circumferentially from said convex blade edge, each set of teeth acting independently and thereby increasing the efficiency of said convex saw tooth cutting edge and for preventing shavings accumulation therebetween.

2. In the hack saw blade of the class described adapted for cutting metals, comprising, a longitudinal saw blade having a wide center section and having its ends gradually decreased in width and each end thereof terminating with an anchor hole, for holding said blade within a frame, a straight line edge extending between said anchor holes, a convex saw tooth edge positioned at the opposite side of said blade edge having the saw teeth staggered alternately and sidewardly extending therefrom, a plurality of cooling and lubricating means positioned within the width of said blade, so that when sawing and cutting the metal the said teeth edges will extend outwardly from the sides and be exposed circumferentially from the convex blade edge for preventing shavings accumulation therein and when lubricated preventing the crystallization of the said saw teeth.

3. In the saw blade of the class described adapted for cutting metals and the like, comprising, a longitudinal saw blade having a comparatively wide center section and gradually decreasing its width toward the ends, an anchoring hole positioned at each end of said blade for holding it in place within the blade frame, a convex edge means positioned at one edge of said blade and circularly extending between the blade ends, saw teeth disposed at the said convex edge having its teeth staggered sidewardly therefrom and outwardly from the said convex edge, two sets of saw teeth means positioned at the said convex edge of said blade, each set extending outwardly from the center section and at oppositely different angular tooth pitch, so that the said saw tooth blade may be used for cutting at the forward and backward strokes, and the said teeth extending sidewardly and circularly from the cutting edge will prevent the shavings accumulation therebetween, and cooling and lubricating means disposed within said blade width for preventing the crystallization of the said saw teeth, substantially as described.

WALTER BOE.
TONY G. STUPPY.